United States Patent
Cordier et al.

(10) Patent No.: US 11,544,480 B2
(45) Date of Patent: *Jan. 3, 2023

(54) METHOD FOR COMPENSATING FOR A PHASE SHIFT BETWEEN THE SIGNAL EMITTED BY AN OBJECT AND THAT RECEIVED FROM A READER EQUIPPED WITH AN ENVELOPE DETECTOR AND CORRESPONDING OBJECT

(71) Applicant: STMicroelectronics (Rousset) SAS, Rousset (FR)

(72) Inventors: Nicolas Cordier, Aix-en-Provence (FR); Anthony Tornambe, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 19 days.

This patent is subject to a terminal disclaimer.

(21) Appl. No.: 17/357,182

(22) Filed: Jun. 24, 2021

(65) Prior Publication Data

US 2021/0319191 A1    Oct. 14, 2021

Related U.S. Application Data

(63) Continuation of application No. 16/855,458, filed on Apr. 22, 2020, now Pat. No. 11,100,299.

(51) Int. Cl.
*G06K 7/10* (2006.01)

(52) U.S. Cl.
CPC ..... *G06K 7/10237* (2013.01); *G06K 7/10148* (2013.01)

(58) Field of Classification Search
None
See application file for complete search history.

(56) References Cited

U.S. PATENT DOCUMENTS

| 9,755,702 | B2 * | 9/2017 | Cho | H04B 5/0031 |
|---|---|---|---|---|
| 9,806,771 | B1 * | 10/2017 | Hueber | H04W 4/80 |
| 9,918,280 | B1 * | 3/2018 | Hueber | H04W 52/226 |
| 9,929,779 | B2 * | 3/2018 | Hung | H04B 5/0037 |
| 10,135,257 | B1 * | 11/2018 | Adolf | H02J 50/12 |
| 10,333,535 | B1 * | 6/2019 | Mendel | H03L 7/23 |
| 10,334,421 | B2 * | 6/2019 | Cho | H04B 5/0031 |
| 10,567,092 | B2 | 2/2020 | Hueber et al. | |

(Continued)

FOREIGN PATENT DOCUMENTS

| EP | 3280065 A1 | 2/2018 |
|---|---|---|
| EP | 3451545 A2 | 3/2019 |

*Primary Examiner* — Fekadeselassie Girma
(74) *Attorney, Agent, or Firm* — Slater Matsil, LLP (57) ABSTRACT

An operation of calibrating the object using a reference reader is performed, the calibration operation including an operation of placing the reference reader at various distances away from the object that correspond to various values of a parameter within the object that is representative of the intensity of the signal received by the object, and, for each distance, an operation of determining an internal phase-shift compensation in the object with respect to a nominal internal phase shift, making it possible to obtain a load modulation amplitude that is higher, in terms of absolute value, than a threshold, and an operation of storing a lookup table of the various values of the parameter and the corresponding internal phase-shift compensations.

20 Claims, 6 Drawing Sheets

(56) References Cited

U.S. PATENT DOCUMENTS

| | | | | |
|---|---|---|---|---|
| 10,756,881 | B2* | 8/2020 | Hueber | H04W 4/80 |
| 2010/0054903 | A1* | 3/2010 | Jones | B66C 1/445 |
| | | | | 414/800 |
| 2011/0021887 | A1* | 1/2011 | Crivelli | A61B 5/02154 |
| | | | | 600/302 |
| 2011/0047188 | A1* | 2/2011 | Martins | G06K 19/07749 |
| | | | | 707/E17.005 |
| 2012/0226418 | A1* | 9/2012 | Veen | B60N 2/976 |
| | | | | 297/217.3 |
| 2014/0351098 | A1* | 11/2014 | Shafer | G06Q 10/087 |
| | | | | 705/28 |
| 2015/0126111 | A1* | 5/2015 | Socol | G06K 19/0723 |
| | | | | 455/41.1 |
| 2015/0175172 | A1* | 6/2015 | Truong | G10L 25/48 |
| | | | | 701/36 |
| 2016/0134382 | A1* | 5/2016 | Mofidi | H04B 17/21 |
| | | | | 455/41.1 |
| 2016/0241384 | A1* | 8/2016 | Frantzeskakis | H04B 5/0031 |
| 2017/0163357 | A1* | 6/2017 | Cordier | H04B 5/0031 |
| 2017/0169258 | A1* | 6/2017 | Neffe | H04B 5/0031 |
| 2017/0300723 | A1* | 10/2017 | Kovacic | G06K 7/10009 |
| 2018/0006801 | A1* | 1/2018 | Hung | G06K 19/0723 |
| 2018/0013596 | A1* | 1/2018 | Nakano | H04B 1/59 |
| 2018/0025267 | A1* | 1/2018 | Kune | H04L 7/033 |
| | | | | 235/492 |
| 2018/0034505 | A1* | 2/2018 | Dedieu | G06K 7/10297 |
| 2018/0034510 | A1* | 2/2018 | Hueber | H04B 17/12 |
| 2018/0034622 | A1* | 2/2018 | Hueber | H04L 45/745 |
| 2018/0132017 | A1* | 5/2018 | Giuliani | H04R 1/00 |
| 2018/0198489 | A1* | 7/2018 | Leow | H04L 7/0331 |
| 2018/0287669 | A1* | 10/2018 | Nakano | H04B 17/0087 |
| 2019/0074914 | A1* | 3/2019 | Hueber | H04B 5/0056 |
| 2019/0088098 | A1* | 3/2019 | Gangumalla | G01L 27/005 |
| 2019/0148978 | A1* | 5/2019 | Chang | H02J 50/10 |
| | | | | 320/108 |
| 2020/0356736 | A1* | 11/2020 | Cordier | H04B 5/0081 |
| 2022/0271568 | A1* | 8/2022 | Cordier | H02J 7/0047 |

* cited by examiner

| $\Delta\phi_a$ \ d | 0mm | 10mm | 20mm | 30mm | 40mm | 50mm |
|---|---|---|---|---|---|---|
| 0° | | | | | | |
| 15° | 100 | 100 | 100 | 100 | 100 | 100 |
| 30° | | | | | | |
| 90° | | | | 100 | | 0 |
| 105° (Δφ1) | | | | 42 | | 100 |
| 180° | | | | | | 100 |
| 195° (Δφj) | | | | 100 | | |
| 270° | | | | | | 15 |
| 285° (Δφ2) | | | | 0 | | 100 |
| 360° | | | | 100 | | 100 |

PSR (15° row), PSR1 (105°/30mm = 42, 180°/50mm = 100), PSR2 (285°/30mm = 0)

METHOD FOR COMPENSATING FOR A PHASE SHIFT BETWEEN THE SIGNAL EMITTED BY AN OBJECT AND THAT RECEIVED FROM A READER EQUIPPED WITH AN ENVELOPE DETECTOR AND CORRESPONDING OBJECT

CROSS-REFERENCE TO RELATED APPLICATIONS

This application is a continuation of U.S. patent application Ser. No. 16/855,458, filed Apr. 22, 2020, which application claims priority to French Patent Application No. 1904732, filed on May 6, 2019, which applications are hereby incorporated herein by reference.

TECHNICAL FIELD

Embodiments and implementations of the invention relate to wireless communication between a reader and an object, for example, but not limited to, a mobile telephone in card-emulation mode, in particular an NFC (near-field communication) object, and more particularly to the compensation for a phase shift between the signal transmitted by the object and that received by the reader during communication by active load modulation (ALM), most particularly when the reader is provided with an envelope detector for decoding the information received from the object.

BACKGROUND

Near-field communication, better known to those skilled in the art under the name NFC, is a wireless connectivity technology that allows communication over a short distance, for example 10 cm, between electronic devices, such as for example contactless chip cards or mobile telephones in card-emulation mode, and readers.

NFC technology is particularly suitable for connecting any type of user device and allows fast and easy communication.

A contactless object is an object that is capable of exchanging information via an antenna with another contactless object, for example a reader, in accordance with a contactless communication protocol.

An NFC object, which is a contactless object, is an object that is compatible with NFC technology.

NFC technology is an open technological platform that has been standardized in the ISO/IEC 18092 and ISO/IEC 21481 standards, but incorporates numerous standards that already exist, such as for example the Type A and Type B protocols defined in the ISO-14443 standard, which may be communication protocols able to be used in NFC technology.

Mention may also be made of the FeliCA protocol, also known as "NFC-F technology", which is standardized in the standard JIS.X.6319-4.

Besides its conventional telephonic function, a cellular mobile telephone may be used (if it is provided with specific means) to exchange information with another contactless device, for example a contactless reader, by using a contactless communication protocol that is usable in NFC technology.

This allows information to be exchanged between the contactless reader and secure elements located in the mobile telephone. Numerous applications are thus possible, such as mobile ticketing for public transport (the mobile telephone acting as a transport ticket) or mobile payment (the mobile telephone acting as a payment card).

During a transmission of information between a reader and an object in card- or ticket-emulation mode, the reader generates a magnetic field via its antenna, which is generally a sinusoidal wave at 13.56 MHz in the standards that are conventionally used. The strength of the magnetic field is between 0.5 and 7.5 amps/meter RMS (root mean square).

Two modes of operation are then possible, a passive mode or an active mode.

In the passive mode, only the reader generates the magnetic field and the object, in card- or ticket-emulation mode, is then passive and always acts as the target.

More specifically, the antenna of the object emulating the ticket or the card modulates the field generated by the reader.

This modulation is performed by modifying the load connected to the terminals of the antenna of the object.

By modifying the load at the terminals of the antenna of the object, the output impedance of the antenna of the reader changes due to the magnetic coupling between the two antennas. This results in a change in the amplitudes and/or the phases of the voltages and currents that are present in the antennas of the reader and of the object.

Thus, in this way, the information to be transmitted from the object to the reader is transmitted, by load modulation, to the antenna currents of the reader.

The load variation performed in the load modulation is reflected in an amplitude modulation and/or phase modulation of the signal (voltage or current) at the antenna of the reader. A copy of the antenna current is generated and injected into the reception chain of the reader, where this current is demodulated and processed to extract the transmitted information.

In the active mode of operation, the reader and the object in card-emulation mode both generate an electromagnetic field. Generally, this operating mode is used when the object is provided with its own power source, for example a battery, as is the case with a cellular mobile telephone, which is then in card-emulation mode.

Each of the NFC devices transmits data using a modulation scheme, typically an ASK (amplitude-shift-keying) amplitude-modulation scheme.

In this case too, the modulation is reflected by a load modification, and reference is then made to communication through active load modulation.

In comparison with a passive communication mode, greater operating distances are obtained, which may range as far as 20 cm depending on the protocol that is used.

Moreover, the use of active load modulation makes it possible to use small antennas.

However, this type of communication by active load modulation presents other problems.

It is desirable, when communicating by active load modulation, for the signal transmitted by the device in card-emulation mode to be in phase, or in phase opposition, with the signal received from the reader to have, at the reader and hence also at the device in card-emulation mode, a modulation amplitude that is as large as possible in terms of absolute value.

A phase adjustment is generally performed on the device in card-emulation mode during the development of the device in a known environment.

However, this restriction of obtaining a modulation amplitude that is as large as possible in terms of absolute value leads to interoperability problems with certain readers.

Specifically, contactless-reader infrastructure is not updated often, in particular in the transport sector, and the object in card-emulation mode must be able to operate with old readers of limited performance, such as those with only envelope-detection reception architecture, different from the architectures having two channels, I and Q, in phase quadrature.

Examples of such envelope-detector readers may implement the FeliCa protocol.

However, the inventors have observed that the distance between such envelope-detector readers and the object in card-emulation mode influences the coupling effect, in particular when this distance is small, for example smaller than 50 mm, which results in a mismatch in the reader-object system, and hence introduces a phase shift between the signal received by the reader and the signal transmitted by the object or vice versa.

There is therefore a need for this phase shift to be decreased as much as is possible or to be eliminated entirely.

SUMMARY

According to one embodiment and implementation, what is proposed is performing such a phase compensation in the object in card-emulation mode, in a straightforward manner, just once at the end of the production process for the object, i.e. before it is brought into operational use.

According to one aspect, what is proposed is a method for adjusting an object capable of communicating contactlessly, by active load modulation, with a reader provided with an envelope detector.

The method comprises, during the production or manufacture of the object, an operation of calibrating the object using a reference reader of the same type as said reader.

This reference reader therefore also includes an envelope detector.

This reference reader may be emulated on a test bed in accordance with the EMVCo standard or be a reader that is identical to the commercial readers that will be used to communicate with said object, for example a commercial reader implementing the FeliCa protocol.

Said calibration operation includes placing the reference reader at various distances away from the object that correspond to various values of a parameter within the object that is representative of the intensity of the signal received by the object, and, for each distance, determining, within the object, an internal phase-shift compensation in the object with respect to a nominal internal phase shift, making it possible to obtain a load modulation amplitude that is higher, in terms of absolute value, than a threshold; and storing, in the object, a lookup table of the various values of said parameter and the corresponding internal phase-shift compensations.

When said object comprises an automatic-gain-control means, said values of the parameter may be the gain values.

As a variant, said parameter may be an indicator of the intensity of the signal received by said object, commonly known to those skilled in the art as an RSSI (received signal strength indication).

Depending on whether the signal transmitted by the antenna of the object and the signal received by the reader are in phase opposition or in phase, the amplitude of the modulation may be negative or positive.

For example, if the phase shift, at the antenna of the object, between the signal transmitted by this antenna and the signal received by this antenna is 180°, then, at the reader, the signal transmitted by the reader and the signal received by the reader will be in phase, thus resulting in a positive maximum load modulation amplitude.

The internal nominal phase shift in the object may then be chosen to obtain, at the antenna of the object, a phase shift of 180° for example.

In practice, the threshold may for example be set at 95% of the maximum value, in terms of absolute value, of the load modulation amplitude.

The method also comprises, during a communication between said reader and the object thus produced and therefore calibrated, determining, within the object, the value of said parameter and automatically applying, in said object, said phase-shift compensation corresponding to the value of this parameter on the basis of said stored lookup table.

Thus, what is de facto obtained is a load modulation amplitude that is higher, in terms of absolute value, than said threshold.

It would be possible, during the calibration operation, to determine said internal phase-shift compensation in the object that makes it possible to obtain a load modulation amplitude that is higher, in terms of absolute value, than said threshold by directly measuring, at the reference reader, the load modulation amplitude for various phase-shift compensation values, in particular if the reference reader is emulated on an EMVCo test bed, or by accessing the internal components of the reference reader.

However, there is a simpler solution for determining said internal phase-shift compensation in the object that makes it possible to obtain a load modulation amplitude that is higher, in terms of absolute value, than said threshold, which solution is applicable, for example, to a commercial reference reader that it is not desired to "open up".

More specifically, according to this solution, this operation of determining the internal phase-shift compensation that makes it possible to obtain, for a given distance, a load modulation amplitude that is higher, in terms of absolute value, than said threshold comprises an operation of defining a set of internal phase shifts comprised between 0° and 360°, for example phase shifts that are spaced apart from one another by the same value, for example 15°, and, for each phase shift in said set;

successive dispatches of commands on the part of the reference reader and successive transmissions of responses to said commands on the part of the object, for example dispatches of 100 commands;

an operation of accounting for the rate of responses that are successfully decoded by the reference reader;

an operation of determining the two phase-shift values corresponding to the two lowest rates;

the value of said phase-shift compensation that is associated with said distance and that makes it possible to obtain a load modulation amplitude that is higher, in terms of absolute value, than said threshold being the median value between said two values corresponding to the two lowest rates minus the value of the nominal internal phase shift.

Thus, for example, if the nominal value of the internal phase shift corresponds to a phase shift of 180° at the antenna of the object and the two internal phase-shift values corresponding to the lowest rates are internal phase-shift values corresponding, at the antenna, to phase shifts of 1050 and 285°, then the median value of the two internal phase-shift values minus the value of the nominal internal phase shift corresponds, at the antenna, to the median value of 1950 between the two values of 1050 and 285° minus 180°.

The desired value of said internal phase-shift compensation is therefore, in this example, the value that will give, at the antenna, a phase-shift compensation that is equal to 150 (195°-180°).

When the object and the reference reader communicate according to the FeliCa communication protocol defined in the standard JIS.X.6319-4, the commands transmitted by the reference reader are for example SENSF_REQ commands defined in the standard JIS.X.6319-4 and the responses transmitted by the object are for example SENSF_RES responses defined in the standard JIS.X.6319-4.

According to another aspect, what is proposed is an object capable of communicating contactlessly, by active load modulation, with a reader provided with an envelope detector.

The object comprises a controller connected to an antenna via an impedance-matching circuit, together forming a resonant circuit having a resonant frequency.

The object also comprises a memory holding a lookup table resulting from the application of the method such as the method defined above.

The controller is configured, during a communication with the reader, to determine a parameter within the object that is representative of the intensity of the signal received by the object and to automatically apply, in said object, a phase-shift compensation corresponding to the value of this parameter on the basis of said stored lookup table.

According to one embodiment, the controller may comprise an automatic-gain-control means, and said values of the parameter are the gain values.

As a variant, the controller may comprise means that are configured to measure an indicator of the intensity of the signal received by said object, said parameter being this indicator of the intensity of the received signal.

According to one embodiment, the controller comprises an adjustable delay means that is arranged on the pathway for the transmission of the signals, and adjustment means that are configured to adjust the value of the delay to obtain the desired internal phase-shift compensation.

According to one embodiment, the controller is a controller that is compatible with a near-field communication technology and is configured to communicate with the reader according to the FeliCa communication protocol defined in the standard JIS.X.6319-4.

The object may be for example a communication device, such as a mobile telephone or a tablet, or a smartwatch, without these examples being limiting.

BRIEF DESCRIPTION OF THE DRAWINGS

Other advantages and features of the invention will become apparent on examining the detailed description of completely non-limiting implementations and embodiments and the appended drawings, in which.

DETAILED DESCRIPTION OF ILLUSTRATIVE EMBODIMENTS

Figure 1:
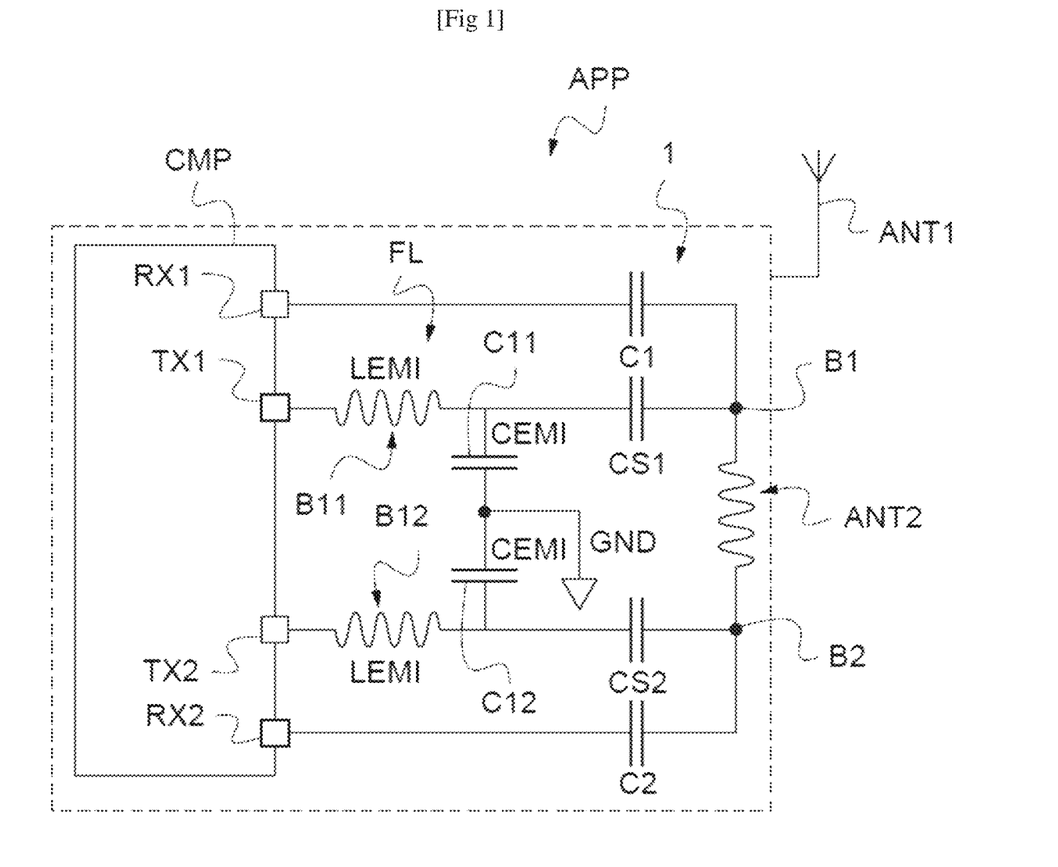
FIGS. 1-8 illustrate various embodiments and implementations of the invention.

In FIG. 1, the reference APP denotes an object, here a communication device, for example a cellular mobile telephone, provided with an antenna ANT1 for establishing telephonic communications.

In the present case, the device APP also includes a conventional NFC system including an NFC contactless component CMP, for example an NFC chip or controller.

The component CMP may be for example that referred to by STMicroelectronics using the reference ST54J.

The device is here capable of communicating contactlessly with a reader by active load modulation.

The controller CMP possesses, as is conventional, two contacts TX1, TX2 that can be used in reader mode and in card mode and two other contacts RX1, RX2 that can be used in reader mode and in card mode.

In card mode, the two contacts TX1 and TX2 are used to generate the active load modulation.

An antenna ANT2, for example an inductive winding, is able to be used for contactless communication with an external device. A first terminal B1 of this antenna ANT2 is connected to the contacts TX1 and RX1 while the second terminal B2 of the antenna ANT2 is connected to the contacts TX2 and RX2.

Lastly, an external impedance-matching circuit 1 is connected between the antenna ANT2 and the component CMP.

More specifically, as is conventional and known per se, this impedance-matching circuit may include a filter FL that is intended to filter out electromagnetic interference (EMI filter).

This filter FL is conventionally an LC filter including here a coil B11 that is connected in series, between the contact TX1 and the ground GND, with a capacitor C11.

The filter FL also includes a coil B12 that is connected in series, between the contact TX2 and the ground GND, with a capacitor C12.

The inductance of the coil B11 and of the coil B12 is equal to LEMI while the capacitive value of the capacitors C11 and C12 is equal to CEMI.

These two values form, respectively, a reference inductance and a reference capacitive value for the EMI filter.

These reference values are associated with a cut-off frequency of the EMI filter, referred to hereinafter as the reference cut-off frequency (for example 20 MHz for a carrier frequency of 13.56 MHz).

Additionally, these reference values LEMI and CEMI are chosen to form a resonant circuit around the reference cut-off frequency f of the filter FL.

The impedance-matching circuit also includes the capacitors C1, C2, CS1 and CS2.

The capacitors C1 and C2 form a capacitive divider across the terminals of the contacts RX1 and RX2.

Regarding the capacitors CS1 and CS2, they are chosen to maximize the current through the antenna ANT2 in order to increase the amplitude of the electromagnetic field.

In order to operate optimally, the component CMP forms, with the antenna ANT2 and the external impedance-matching circuit, a resonant circuit having a resonant frequency that is equal to the carrier frequency, for example 13.56 MHz in the case of a FeliCA communication protocol defined in the standard JIS.X.6319-4.

However, when actually producing the external impedance-matching circuit, the actual inductances and the actual capacitive values of the various elements of this external impedance-matching circuit may vary with respect to the theoretical values due in particular to the technological variation in the coils and capacitors used.

In normal use, the reader transmits a signal SGR that has a phase $\phi r$. The communication device in card mode responds to the commands from the reader with a signal SGE at the same frequency having the phase $\phi alm$, which is equal to:

$$\phi alm = \phi r + \Delta\phi$$

There is therefore an internal phase shift in the object equal to Δϕ between the signal transmitted by the object and the signal received from the reader.

This internal phase shift results in particular from the components (resistors, capacitors, inductors) of the transmission pathway and from the components (resistors, capacitors, inductors) of the reception pathway.

This shift Δϕ is adjusted in the factory during the production of the object to provide it with a nominal value making it possible to obtain, at the antenna of the object, a phase shift of 180° for example.

Specifically, with such a phase shift, a modulation amplitude level that is higher, in terms of absolute value, than a threshold is obtained. This threshold may be for example equal to 95% of the maximum level.

Figure 3:
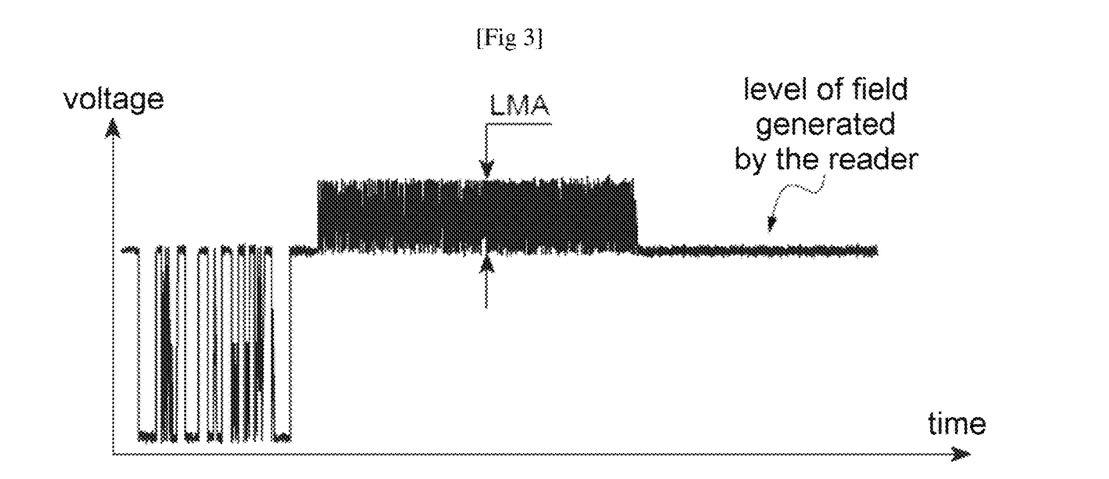

It is recalled that, as illustrated in FIG. 3, the modulation amplitude LMA corresponds to the voltage difference with respect to the level of the field generated by the reader.

Figure 4:
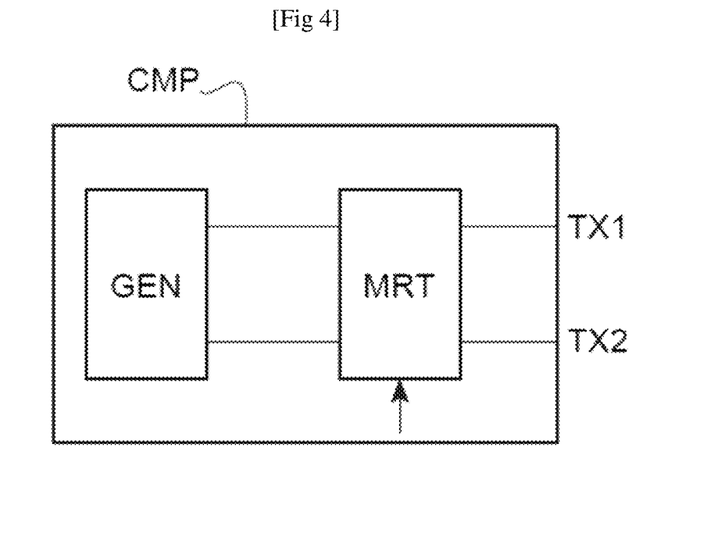

In practice, adjusting the phase shift Δϕ to its nominal value may be achieved, as illustrated in FIG. 4, by adjusting the delay value of the delay means MRT that are arranged on the transmission pathway of the component CMP and aiming to delay the initial signal generated by the means GEN for generating the response.

This first calibration operation, performed in the factory, makes it possible in particular to determine the difference between the nominal value of Δϕ and the nominal value of 180° of the phase shift measured at the antenna of the object, which phase-shift difference is due, as mentioned above, to the components (resistors, capacitors, inductors) of the transmission pathway and to the components (resistors, capacitors, inductors) of the reception pathway.

The inventors have observed that the distance between an envelope-detector reader, implementing the FeliCa protocol for example, and the object in card-emulation mode influences the coupling effect, in particular when this distance is small, for example smaller than 50 mm, which results in a mismatch in the reader-object system, and hence introduces a phase shift between the signal received by the reader and the signal transmitted by the object or vice versa.

Because of this, the value of the phase shift Δϕ varies with respect to its nominal value set in the factory.

What is therefore proposed is automatically applying, within the object, a phase-shift compensation in order to return to the nominal value of Δϕ.

To this end, what is proposed is performing, in the factory, another operation of calibrating 50 (FIG. 5) the object APP using a reference reader RDR of the same type as said reader.

Figure 5:
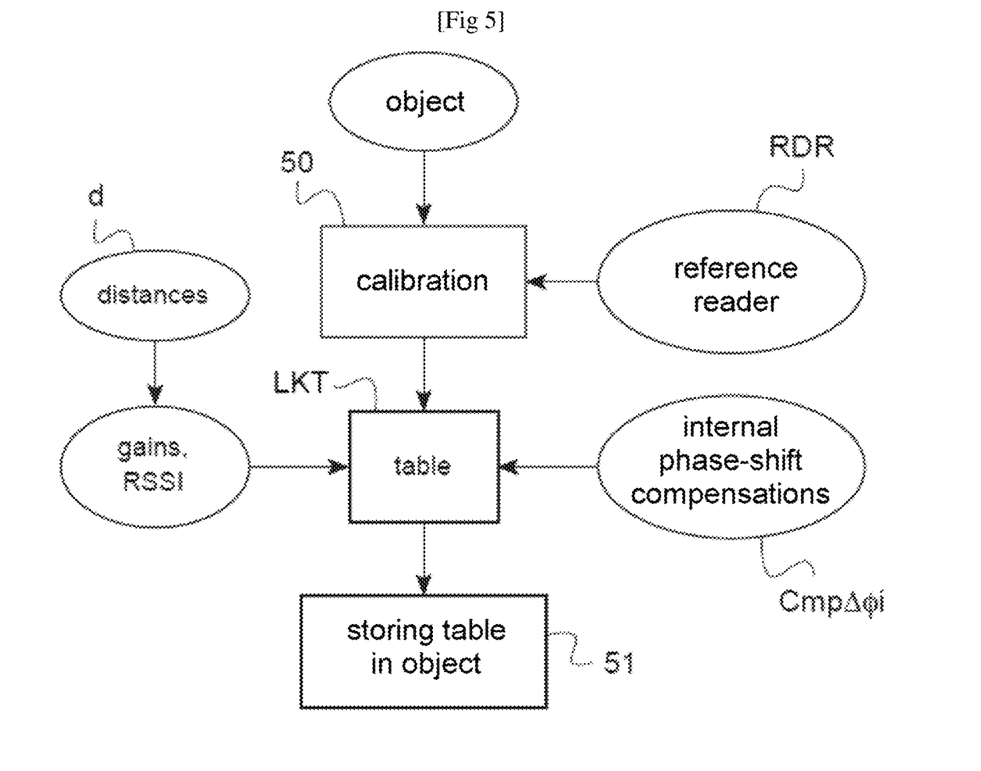

This reference reader RDR therefore also includes an envelope detector.

This reference reader is for example a commercial reader implementing the FeliCa protocol.

Said calibration operation 50 includes placing the reference reader RDR at various distances d away from the object APP that correspond to various values of a parameter within the object that is representative of the intensity of the signal received by the object, and, for each distance d, determining, in the object, an internal phase-shift compensation CmpΔϕi in the object with respect to a nominal internal phase shift, making it possible to obtain a load modulation amplitude that is higher, in terms of absolute value, than a threshold; and storing 51 a lookup table LKT of the various values of said parameter and the corresponding internal phase-shift compensations CmpΔϕi.

When said object comprises an automatic-gain-control AGC means (FIG. 2), said values of the parameter may be the gain values.

Figure 2:
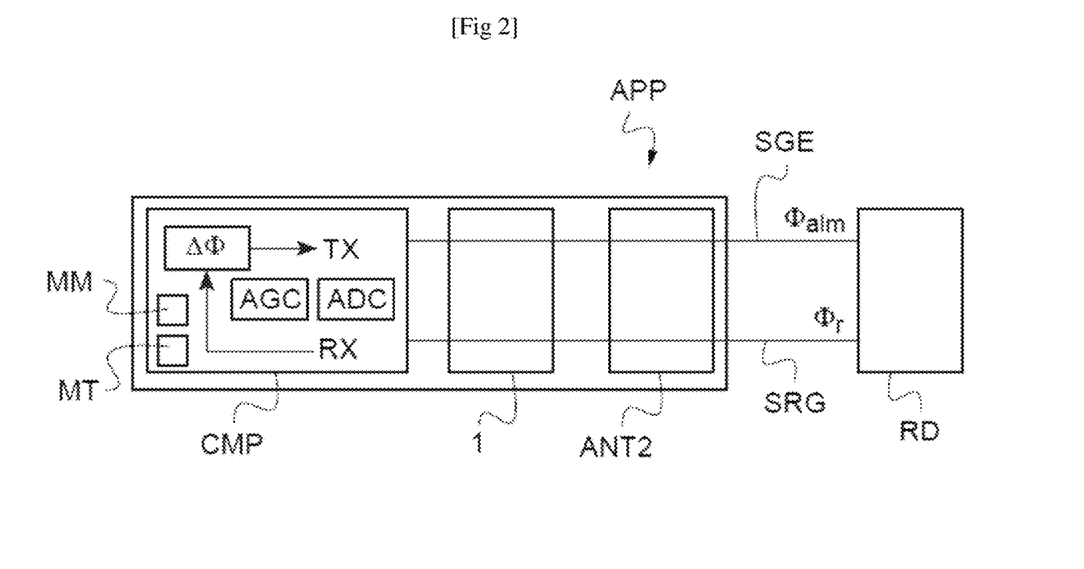

As a variant, said parameter may be an indicator of the intensity of the signal received by said object, commonly known to those skilled in the art as an RSSI (received signal strength indication).

The table LKT is stored in a memory MM of the component CMP (FIG. 2).

Figure 6:
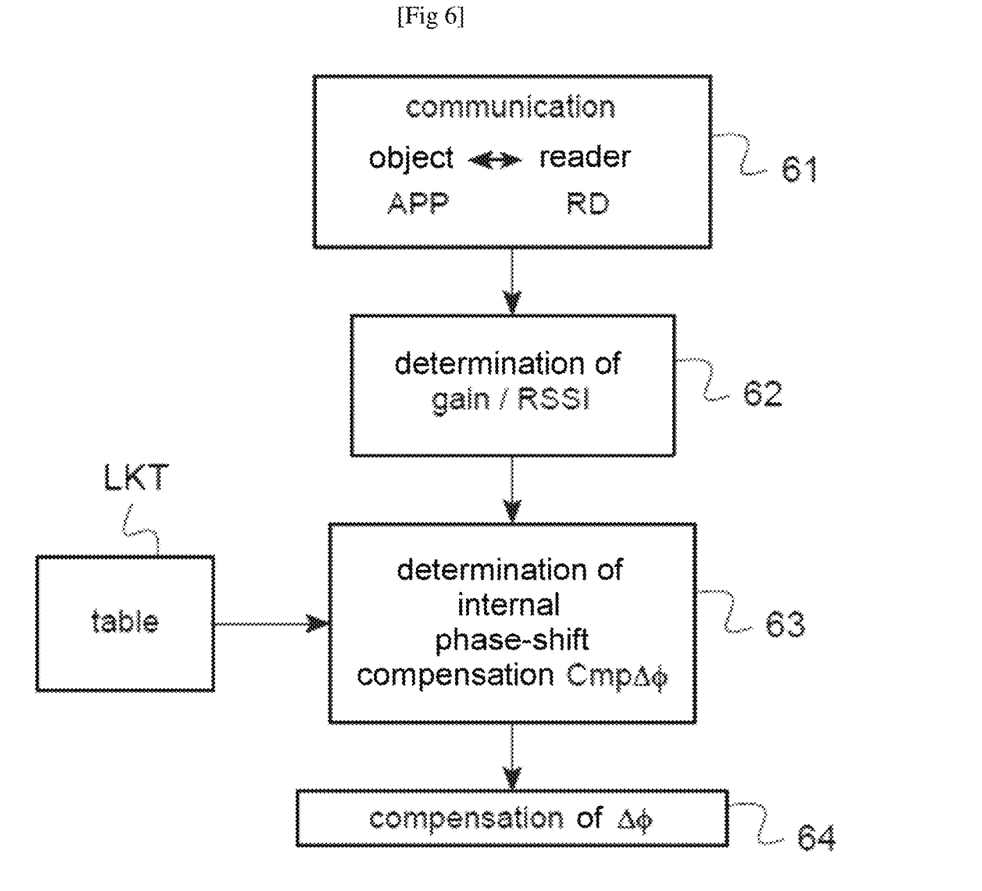

Next, as illustrated in FIG. 6, during an operational communication 61 between the object APP and a reader RD in the same family as the reference reader RDR, the component CMP determines the value of the parameter (gain or RSSI) in a step 62.

To this end, if, as illustrated in FIG. 2, the component CMP includes an automatic-gain-control AGC means, the parameter may then be the corresponding value of the gain delivered by the AGC means.

The parameter may also be the parameter RSSI, which is easily obtained for example from an analogue-to-digital converter ADC.

Next, in a step 63, a state machine MT implemented in the component CMP (FIG. 2) determines, on the basis of the value of the gain or of the parameter RSSI and of the table LKT, the internal phase-shift compensation CmpΔϕ to be applied to the nominal internal phase shift Δϕ to obtain, at the antenna, for example a nominal phase shift of 180°.

This compensation of Δϕ, CmpΔϕ, is applied in step 64.

Figure 7:
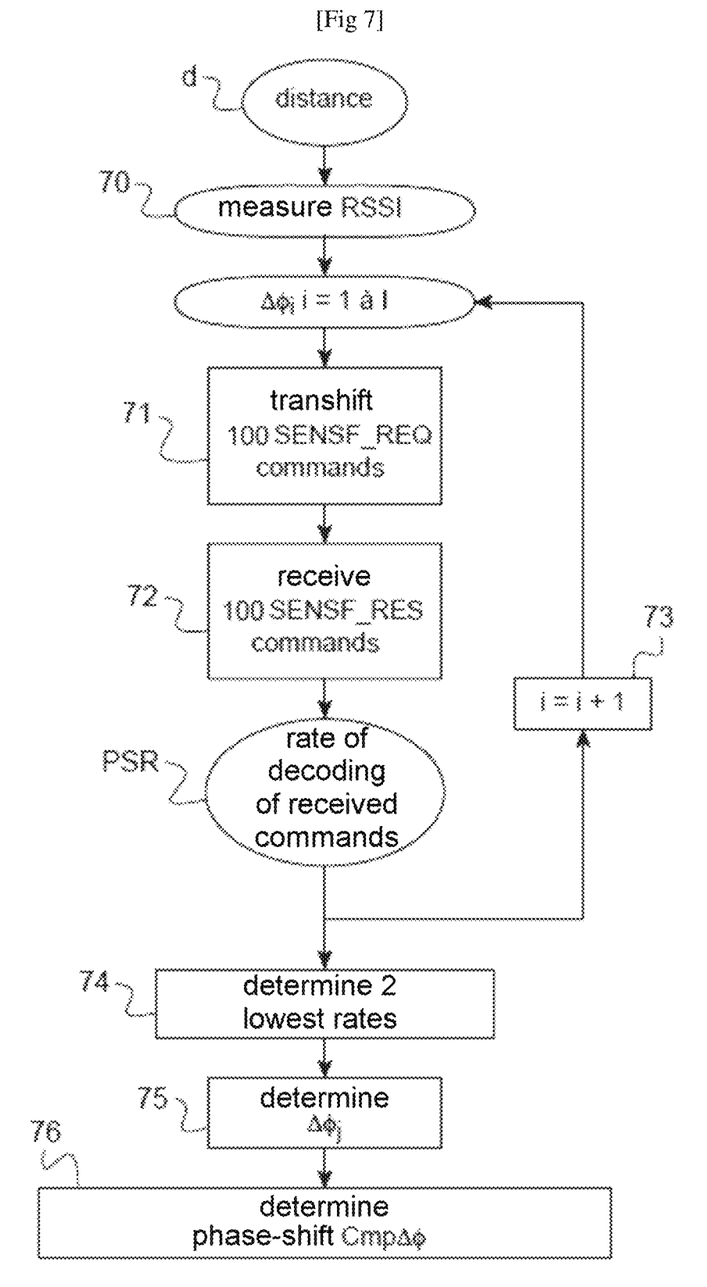
Figure 8:
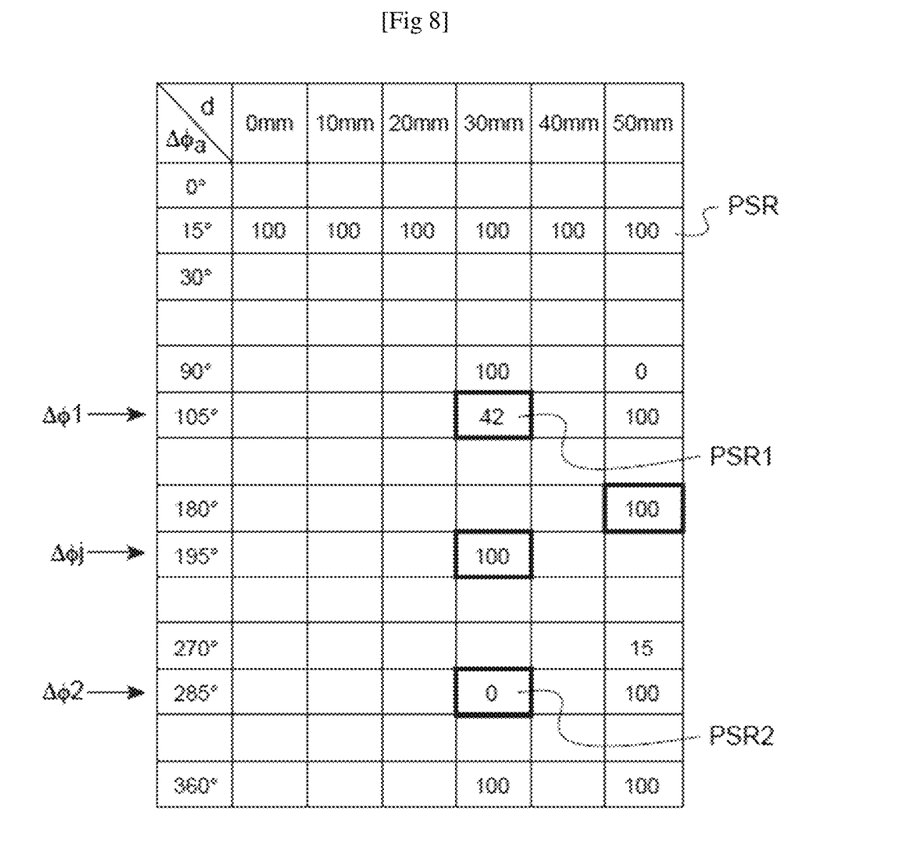

Reference is now made to FIGS. 7 and 8 to illustrate an example of determining the phase-shift compensation CmpΔϕ associated with a given value of the parameter, for example with a given value of the parameter RSSI, and hence with a given distance d between the object and the reference reader.

More particularly, as illustrated in FIG. 7, for a given distance d between the object APP and the reference reader, a measurement 70 of the parameter RSSI is taken.

Next, using the delay means MRT, a certain number of internal phase shifts Δϕi, for example here I internal phase shifts Δϕi, are applied within the object APP such that all of these internal phase shifts correspond to phase shifts Δϕa at the antenna ANT2 of the object covering the range of 0°-360° (FIG. 8).

In the example illustrated, it is possible to apply a resolution to Δϕi corresponding to a resolution of 15° on Δϕa.

For a value of the internal phase shift Δϕi corresponding to a value of the phase shift Δϕai, the reference reader transmits, in step 71, a packet of commands, here 100 commands, namely SENSF_REQ commands defined in the FeliCa protocol.

Next, in step 72, the receiver receives 100 SENSF_RES commands corresponding to the responses transmitted by the object APP.

It is then possible to determine, at the reference reader, a rate of decoding the Packet Success Rate (PSR) of the received commands.

To this end, depending on the reference reader used, it is possible to connect an interface to the reference reader in order to determine whether the received command has been decoded correctly or otherwise. As a variant, the reference reader may transmit a specific sound signal if the received command has not been decoded correctly.

The operations 71, 72 are repeated (step 73) for each phase-shift increment Δϕi corresponding to an increment of 15° on the phase shift Δϕa at the antenna of the object until the entire phase-shift range of 0-360° at the antenna ANT2 of the object has been covered.

Next, in step 74, the two lowest decoding rates PSR1 and PSR2 for the distance d are determined.

In the example illustrated in FIG. 8, for the distance d=30 mm, the two lowest rates PSR1 and PSR2, that are equal, respectively, to 42 and to 0, correspond to internal phase shifts Δφ1 and Δφ2 corresponding, respectively, to phase shifts Δφa at the antenna ANT2 that are equal to 105° and 285°.

The median value between these two values 105° and 285° is equal to 195°. Furthermore, it is at this median value of 195° that not only a rate PSR equal to 100%, but also with a maximum modulation amplitude LMA, or in any case a modulation amplitude that is higher than a predetermined threshold, for example 95%, is obtained.

An internal phase shift Δφj, determined in step 75, corresponds to this value of 195° for the phase shift Δφa at the antenna.

The difference between this internal phase shift Δφj and the nominal value of this internal phase shift corresponds to the phase-shift compensation CmpΔφ determined in step 76.

It should be noted that, for a distance that is greater than a certain value, for example 50 mm in this example, the coupling between the reader and the object no longer varies and there is no need to apply phase-shift compensation to the nominal value Δφ.

What is claimed is:

1. A method for adjusting an object communicating contactlessly, by active load modulation, with a reader provided with an envelope detector, the method comprising:
   an operation of calibrating the object using a reference reader of the same type as the reader, the calibration operation including
   placing the reference reader at various distances away from the object that correspond to various values of a parameter within the object that is representative of an intensity of the signal received by the object, and, for each distance, determining, within the object, an internal phase-shift compensation with respect to a nominal internal phase shift, to obtain a communication success rate with the reference reader that is higher, in terms of absolute value, than a threshold;
   storing, in the object, a lookup table of the various values of the parameter and corresponding internal phase-shift compensations; and
   during a communication between the reader and the object thus produced, determining, within the object, the value of the parameter and automatically applying, in the object, the phase-shift compensation corresponding to the value of this parameter on the basis of the stored lookup table,
   wherein the threshold is set at 95% of a maximum communication success rate.

2. The method according to claim 1, wherein the operation of calibrating the object is performed during production of the object.

3. The method according to claim 1, wherein the operation of determining the internal phase-shift compensation comprises an operation of defining a set of internal phase shifts comprised between 0° and 360°, and, for each phase shift in the set,
   successive dispatches of commands by the reference reader and successive transmissions of responses to the commands by the object,
   an operation of accounting for a rate of responses that are successfully decoded by the reference reader, and
   an operation of determining two phase-shift values corresponding to two lowest rates,
   wherein the value of the phase-shift compensation that is associated with the distance is a median value between the two values corresponding to the two lowest rates minus the value of the nominal internal phase shift.

4. The method according to claim 3, wherein the object and the reference reader communicate according to the FeliCa communication protocol defined in the standard JIS.X.6319-4, and the commands transmitted by the reference reader are SENSF_REQ commands defined in the standard JIS.X.6319-4 and the responses transmitted by the object are SENSF_RES responses defined in the standard JIS.X.6319-4.

5. The method according to claim 1, wherein the object comprises an automatic-gain-control, and the values of the parameter are the gain values.

6. The method according to claim 1, wherein the parameter is an indicator of the intensity of the signal received by the object.

7. An object communicating contactlessly, by active load modulation, with a reader provided with an envelope detector, comprising a controller (CMP) connected to an antenna via an impedance-matching circuit, together forming a resonant circuit having a resonant frequency, a memory holding a lookup table resulting from an application of the method according to claim 1, the controller being configured, during a communication with the reader, to determine a parameter within the object that is representative of the intensity of the signal received by the object and to automatically apply, in the object, a phase-shift compensation corresponding to the value of this parameter on the basis of the stored lookup table.

8. The object according to claim 7, wherein the controller comprises an automatic-gain-control, and the values of the parameter are the gain values.

9. The object according to claim 7, wherein the controller is configured to measure an indicator of the intensity of the signal received by the object, the parameter being this indicator of the intensity of the received signal.

10. The object according to claim 7, wherein the controller comprises an adjustable delay that is arranged on a pathway for transmission of the signals that is configured to adjust the value of the delay to obtain a desired internal phase-shift compensation.

11. The object according to claim 7, wherein the controller is a controller that is compatible with a near-field communication technology and is configured to communicate with the reader according to the FeliCa communication protocol defined in the standard JIS.X.6319-4.

12. The object according to claim 7, wherein the object comprises a communication device.

13. The object according to claim 12, wherein the communication device comprises a mobile telephone or a tablet.

14. A method for adjusting an object capable of communicating contactlessly, by active load modulation, with a reader provided with an envelope detector, the method comprising:
   an operation of calibrating the object using a reference reader of the same type as the reader, the calibration operation including
   placing the reference reader at various distances away from the object that correspond to various values of a parameter within the object that is representative of an intensity of the signal received by the object, and, for each distance, determining, within the object, an internal phase-shift compensation with respect to a nominal internal phase shift, to obtain a communication success rate with the reference reader that is higher, in terms of absolute value, than a threshold;

storing, in the object, a lookup table of the various values of the parameter and corresponding internal phase-shift compensations; and during a communication between the reader and the object thus produced, determining, within the object, the value of the parameter and automatically applying, in the object, the phase-shift compensation corresponding to the value of this parameter on the basis of the stored lookup table, wherein the operation of determining the internal phase-shift compensation comprises an operation of defining a set of internal phase shifts comprised between 0° and 360°, and, for each phase shift in the set, successive dispatches of commands by the reference reader and successive transmissions of responses to the commands by the object, an operation of accounting for a rate of responses that are successfully decoded by the reference reader, and an operation of determining two phase-shift values corresponding to two lowest rates, wherein the value of the phase-shift compensation is a median value between the two values corresponding to the two lowest rates minus the value of the nominal internal phase shift.

15. The method according to claim 14, wherein the operation of calibrating the object is performed during production of the object.

16. The method according to claim 14, wherein the threshold is set at 95% of the maximum value, in terms of absolute value, of a maximum communication success rate.

17. The method according to claim 14, wherein the object and the reference reader communicate according to the FeliCa communication protocol defined in the standard JIS.X.6319-4, and the commands transmitted by the reference reader are SENSF_REQ commands defined in the standard JIS.X.6319-4 and the responses transmitted by the object are SENSF_RES responses defined in the standard JIS.X.6319-4.

18. The method according to claim 14, wherein the object comprises an automatic-gain-control, and the values of the parameter are the gain values.

19. The method according to claim 14, wherein the parameter is an indicator of the intensity of the signal received by the object.

20. The method according to claim 14, wherein the object comprises a mobile telephone or a tablet communication device.

* * * * *